United States Patent [19]
Moreton

[11] Patent Number: 5,876,468
[45] Date of Patent: Mar. 2, 1999

[54] DETERGENTS FOR HYDROCARBON FUELS

[75] Inventor: David John Moreton, Hull, United Kingdom

[73] Assignee: Lubrizol Adibis Holdings (UK) Limited, Merseyside, United Kingdom

[21] Appl. No.: 923,936

[22] Filed: Sep. 5, 1997

[30] Foreign Application Priority Data

Sep. 5, 1996 [GB] United Kingdom ............... 9618546

[51] Int. Cl.$^6$ .................. C10L 1/18; C10L 1/22
[52] U.S. Cl. ........................... 44/415; 564/336
[58] Field of Search ................ 44/415; 564/336

[56] References Cited

U.S. PATENT DOCUMENTS

| | | |
|---|---|---|
| 4,117,011 | 9/1978 | Malec . |
| 4,231,759 | 11/1980 | Udelhofen et al. . |
| 5,300,701 | 4/1994 | Cherpeck . |
| 5,334,775 | 8/1994 | Gutierrez et al. . |
| 5,514,190 | 5/1996 | Cunningham et al. ............... 44/415 |
| 5,634,951 | 6/1997 | Colucci et al. ............... 44/415 |
| 5,697,988 | 12/1997 | Malfer et al. ............... 44/415 |

FOREIGN PATENT DOCUMENTS

| | | |
|---|---|---|
| 2089833 | 8/1993 | Canada . |
| 440 507 A2 | 8/1991 | European Pat. Off. . |
| 647 700 A1 | 4/1995 | European Pat. Off. . |
| 654 524 A2 | 5/1995 | European Pat. Off. . |
| 1 368 532 | 9/1974 | United Kingdom . |
| 93/19140 | 9/1993 | WIPO . |
| 96/11999 | 4/1996 | WIPO . |

*Primary Examiner*—Jacqueline V. Howard
*Attorney, Agent, or Firm*—Renner, Otto, Boisselle & Sklar, P.L.L.

[57] ABSTRACT

Compounds comprising a Mannich reaction product of
a) a polyisobutene-substituted phenol wherein at least 70% of the terminal olefinic double bonds in the polyisobutene are of the vinylidene type;
b) an aldehyde; and
c) ethylene diamine are disclosed, which are shown to have good detergency properties in hydrocarbon fuels.

10 Claims, No Drawings

DETERGENTS FOR HYDROCARBON FUELS

The present invention relates to detergents for use in hydrocarbon fuels. Hydrocarbon fuels generally contain numerous deposit-forming substances. When used in internal combustion engines, deposits tend to form on and around constricted areas of the engine in contact with the fuel. In diesel engines, deposits tend to accumulate in the fuel injection system, thereby hampering good performance of the engine. In automobile engines deposits can build up on engine intake valves leading to progressive restriction of gaseous fuel mixture flow into the combustion chamber and also to valve sticking. It is common practice therefore to incorporate a detergent in the fuel composition for the purpose of inhibiting the formation, and facilitating the removal, of engine deposits, thereby improving engine performance. Certain Mannich condensation products, obtained by reacting hydrocarbon-substituted phenols, aldehydes and amines, are known as detergents for fuels. These have an advantage over polyisobutene amine detergents in that they are substantially chlorine free.

U.S. Pat. No. 4,117,011 discloses as dispersants/detergents for lubricating oils and hydrocarbon fuels Mannich condensation products, obtained by reacting hydrocarbon-substituted phenols, aldehydes, amines and alkylene oxides. Preferred reactants include polyisobutene-substituted phenols, formaldehyde, and alkylene polyamines such as diethylene triamine, which in one process are combined in a Mannich condensation reaction before being reacted with a polyalkylene oxide.

CA-A-2089833 and EP-A-647700 both disclose fuel compositions containing detergent additives which comprise Mannich reaction products of an polyisobutene-substituted phenol, an amine and an aldehyde, the amine preferably being an alkylene polyamine such as diethylene triamine, triethylene tetramine and the like. Although ethylene diamine is mentioned in EP-A-647700 as a possible amine, no compounds employing it are disclosed, and it is not amongst the preferred amines; nor is there any mention in either of these documents of the nature of the polyisobutene employed.

We have discovered that Mannich condensation products of particular polyisobutene-substituted phenols, an aldehyde and ethylene diamine are especially good detergents in fuels, and significantly better than those described in the above-mentioned prior art. These particular products have not been specifically disclosed in any of the above prior art. Accordingly in one aspect the present invention comprises the Mannich reaction product of a) a polyisobutene-substituted phenol where the polyisobutene is one in which at least 70% of the terminal olefinic double bonds are vinylidene;

b) an aldehyde;

c) ethylene diamine.

A second aspect of the invention provides provides a fuel composition comprising a major amount of a hydrocarbon fuel, and from 10 to 1000 ppm of the above reaction product.

Polyisobutenes (PiBs) in which at least 70% of the terminal olefinic double bonds are of the vinylidene type are commonly known as "high reactive" polyisobutenes, as distinct from "low reactive" PiBs (having a lower proportion of vinylidene terminal double bonds) which are commonly used. Examples of "high reactive" polyisobutenes include Ultravis® marketed by BP Chemicals and Glissopal® marketed by BASF. The compounds of the invention, derived specifically from ethylene diamine and a PiB phenol in which the PiB is highly reactive, are surprisingly superior in performance to known fuel detergents based on Mannich chemistry.

Preferably the PiB has a number average molecular weight of from 700 to 2300, particularly from 750 to 1500. The aldehyde is preferably a ($C_1$–$C_6$) aldehyde, most preferably formaldehyde.

As mentioned above, the compounds of the invention are made by a Mannich reaction; the conditions required for Mannich reactions are well known in the art. Another aspect of the invention provides a process for producing a compound as defined above, comprising reacting together an polyisobutene phenol, an aldehyde, and ethylene diamine under conditions suitable for a Mannich condensation reaction.

It is preferred that the compound of the invention is present in the fuel composition in the from of an additive package, the package being present at a level of from 200 to 3000 ppm, preferably from 600 to 1000 ppm. Thus another aspect of the invention provides an additive package for a fuel composition, comprising from 5 to 30% by weight of a compound as defined above, a carrier fluid, and optionally a solvent, preferably an aromatic or aliphatic hydrocarbon solvent. Suitable carrier fluids include alkyl phenols, optionally alkoxylated; esters of acids/alcohols, acids/polyols or acids/glycol ethers, the acids being saturated or unsaturated; phthalate esters; trimellitate esters; alkoxylated alcohols or polyols; polyalkylene glycols; and lubricating oils. Suitable solvents may include most known aromatic or aliphatic hydrocarbons or glycol ethers. The invention also comprises in a still further aspect the use of the above compounds and additive packages as detergents in hydrocarbon fuels.

The hydrocarbon fuel may suitably comprise a hydrocarbon fraction boiling in the gasoline range or a hydrocarbon fraction boiling in the diesel range. Gasolines suitable for use in spark ignition engines, e.g. automobile engines, generally boil in the range from 30° to 230° C. Such gasolines may comprise mixtures of saturated, olefinic and aromatic hydrocarbons. They may be derived from straight-run gasoline, synthetically produced aromatic hydrocarbon mixtures, thermally or catalytically cracked hydrocarbon feedstocks, hydrocracked petroleum fractions or catalytically reformed hydrocarbons. The octane number of the base fuel is not critical and will generally be above 65. In the gasoline, hydrocarbons may be replaced in part by alcohols, ethers, ketones or esters, typically in an amount up to 20% by weight. Alternatively, as the liquid hydrocarbon fuel there may be used any fuel suitable for operating spark compression engines, such as those which may be found in road vehicles, ships and the like. Generally, such a diesel fuel will boil in the range from about 140° C. to about 400° C. (at atmospheric pressure), particularly in the range from about 150° to 390° C., especially from about 175° to 370° C. Such fuels may be obtained directly from crude oil (straight-run) or from a catalytically or thermally cracked product or a hydrotreated product, or from a mixture of the aforesaid. Alternatively there may be used a biofuel, for example rape seed methyl ester. The cetane number will typically be in the range from 25 to 60.

The fuel composition contains the compound of formula (I) in an amount sufficient to provide dispersancy. Typically in a gasoline fuel this amount will be in the range from 20 to 1000 ppm w/w based on the total weight of the composition. Typically in a diesel fuel this amount will be in the range from 10 to 500 ppm w/w based on the total weight of the composition.

The fuel composition may suitably be prepared by blending a concentrate composition comprising a fuel compatible hydrocarbon solvent and the compound of formula (I) with the hydrocarbon fuel.

The fuel composition in addition to the compound of formula (I) may contain known additives. The nature of the additives will depend to some extent on the end-use of the fuel composition. Diesel fuel compositions may contain nitrates or nitrites as a cetane improver, or copolymers of ethylene and/or vinylesters, e.g. vinylacetate, as a pour point depressant. Gasoline fuel compositions may contain a lead compound as an anti-knock additive and/or an antioxidant, e.g. 2,6-di-tert-butyl phenol, and/or an anti-knock compound other than a lead compound, and/or an additional dispersant, for example a PIB polyamine. The other additives (if any) may be blended directly into the fuel composition or may be incorporated by way of a concentrate composition.

The invention will now be further illustrated by reference to the following examples. It should be noted that the comparative examples below all employ Ultravis® 10, a highly reactive polyisobutene, whereas equivalent compounds in the prior art are not disclosed as using a highly reactive polyisobutene and would therefore be expected to perform worse in these tests.

EXAMPLE 1

Preparation of polyisobutene-substituted phenol 203.2 g (2.16 mol) of phenol was melted at 40° C. and added to boron trifluoride etherate (73.5 ml, 0.60 mol) in a 5 liter round bottomed flask. Ultravis® 10 (1040 g, 1.09 mol), a "highly reactive" polyisobutene (PiB) (Mw=1000), was dissolved in hexane (1863 ml) and the solution added to the flask containing the phenol via a pressure equalising dropping funnel, at a rate sufficient to maintain the temperature of the reaction mixture at 22°–27° C. This took three hours. The solution was stirred for a further 16 hours at room temperature before ammonia (400 ml of 30% w/w aqueous, 2.88 mol) was added. The solution turned a deep blue colour. 1000 ml of water was added and the mixture stirred, after which it was separated in a five liter separating funnel and the aqueous layer extracted with 4×500 ml hexane. The organic layers were combined and dried over $MgSO_4$ overnight, then filtered through a 12 mm Celite pad. The solvent was removed from the filtrate at 80° C./23"Hg on a rotary evaporator. The product was found to comprise polyisobutene-substituted phenol with a para to ortho ratio of about 3:1.

EXAMPLE 2

Preparation of adduct of polyisobutene-substituted phenol and ethylene diamine

The polyisobutene-substituted phenol of Example 1 (300 g, 0.295 mol), paraformaldehyde (8.86 g, 0.295 mol) and toluene (100 g, solvent) were charged to a round-bottomed flask and heated rapidly to 100° C., 17.73 g (0.295 mol) of ethylene diamine (EDA) was then added over 5 minutes via a pressure equalising dropping funnel. The reaction was heated to 126° C. for four hours and 5.5 ml water collected: the reaction was then refluxed at 125° C. for three hours. The product was transferred to a one liter Florentine flask and the solvent removed on a rotary evaporator at 80° C./29.5"Hg. A cloudy brown residue was filtered through a 12 mm Celite pad to yield a clear golden viscous liquid. Analysis revealed 1.68% nitrogen, alkalinity value of 70.04 mgKOH $g^{-1}$, 3 ppm residual chlorine.

EXAMPLE 3 (comparative)

Preparation of adduct of polyisobutene-substituted phenol and dimethylaminopropylamine The procedure and reactants of Examples 1 and 2 were followed, except that instead of ethylene diamine, 30.19 g (0.295 mol) of dimethylaminopropylamine (DMAPA) was used. Analysis revealed 2.12% nitrogen, alkalinity value of 85.3 mgKOH $g^{-1}$, 80 ppm residual chlorine.

EXAMPLE 4 (comparative)

Preparation of adduct of polyisobutene-substituted phenol and diethylene triamine The procedure and reactants of Examples 1 and 2 were followed, except that instead of dimethylaminopropylamine, 30.44 g (0.295 mol) of diethylene triamine (DETA) was used. Analysis revealed 3.2% nitrogen, alkalinity value of 135.9 mgKOH $g^{-1}$, 25.8 ppm residual chlorine.

EXAMPLE 5 (comparative)

Preparation of adduct of polyisobutene-substituted phenol and triethylene tetramine The procedure and reactants of Examples 1 and 2 were followed, except that instead of dimethylaminopropylamine, 43.14 g (0.295 mol) of triethylene tetramine (TETA) was used. Analysis revealed 4.4% nitrogen, alkalinity value of 156.2 mgKOH $g^{-1}$, 3.9 ppm residual chlorine.

ENGINE TESTS

A: CEC test

The compounds prepared in the Examples above were evaluated as detergency additives in fuels according to a standard engine test, following method CEC F-05 A-93 on a Mercedes Benz M 102.982 engine. The fuel employed was unleaded CEC RF 83-A-91, and the oil RL-189/1. The compounds tested were incorporated in an additive package with the following formulation:

paradodecylphenol/propylene oxide (11:1 mol ratio) carrier—37.7% by weight

HAN 8572 (Exxon Chemicals) aromatic solvent—45.3% by weight additive of Examples 2–5—17.0% by weight The package was dosed in the fuel at 800 ml/m$^3$.

Measurements were made of the inlet valve deposits, and the valves were also given a visual rating. In this test a visual rating of 9.5 or greater is considered to be a good result.

TABLE 1

| EXAMPLE | DEPOSITS (mg) | AVE. VISUAL RATING |
| --- | --- | --- |
| no additive package | 278 | 7.59 |
| 2 (EDA) | 16 | 9.66 |
| 3 (DMAPA) | 30 | 9.53 |
| 4 (DETA) | 37 | 8.93 |
| 5 (TETA) | 89 | 8.47 |

These results show that the EDA additive is significantly more effective than the additives derived from other amines.

B: Opel Kadett test

The compounds prepared in Examples 2 and 3 above were evaluated as detergency additives in fuels according to the standard Opel Kadett engine test. The fuel employed was "City Gasoline" from Scandanavia. The compounds tested were incorporated in the same additive package as in Test A above. The package was dosed in the fuel at 800 ml/m$^3$ in the case of the DMAPA additive, and 600 ml/m$^3$ in the case of the EDA additive. Measurements were made of the inlet valve deposits as before.

TABLE 2

| EXAMPLE | DEPOSITS (mg) |
|---|---|
| no additive package | 200–250 |
| 2 (EDA)-600 ml/m$^3$ | 0 |
| 3 (DMAPA)-800 ml/m$^3$ | 24 |

This result shows the exceptional performance of the EDA-based additive compared with that of the DMAPA additive, even though the EDA additive was employed at a lower dose rate.

C: 10000 mile Vauxhall Astra field test

The compounds prepared in Examples 2 and 3 above were evaluated as detergency additives in fuels according in a field test, involving 10,000 miles driving in a Vauxhall Astra. The fuel employed unleaded Total Premium ULP MSS/195, and the oil BP Visco 2000. The compounds tested were incorporated in the same additive package as in the two tests above, and the package dosed in the fuel at 800 ml/m$^3$.

Measurements were made of the inlet valve deposits, and the valves were also given a visual rating. In this test a visual rating of 9.5 or greater is considered to be a good result.

TABLE 3

| EXAMPLE | DEPOSITS (mg) | AVE. VISUAL RATING |
|---|---|---|
| no additive package | 427 | 6.5 |
| 2 (EDA) | 23.5 | 9.9 |
| 3 DMAPA | 42 | 9.5 |

These results again show that the EDA additive is significantly more effective than the additives derived from other amines.

D: Diesel engine test

The compounds prepared in the Examples above were evaluated as detergency additives in fuels according Peugeot XUD 9 engine test. The fuel employed was RF90/6 diesel. The compounds tested were incorporated in an additive package with the following formulation:

kerosene-type solvent—35.9% by weight
additive of Examples 2–5—22.7%
cetane improver—18.9%
lubricity agent—9.1%
dodecyl phenol—5.3%
demulsifier—4.6%
corrosion inhibitor—3.0%
antifoam—0.5%

The package was dosed in the fuel at 680 ml/m$^3$.

Measurements were made of percentage flow loss at 0.1 mm needle lift; the lower the figure the better the result.

TABLE 4

| EXAMPLE | % flow loss at 0.1 mm needle lift |
|---|---|
| no additive package | 89.6% |
| 2 (EDA) | 75.6% |
| 3 (DMAPA) | 86.4% |
| 4 (DETA) | 87.3% |
| 5 (TETA) | 81.7% |

These results once again demonstrate the superiority of the EDA detergent.

I claim:

1. Compound comprising a Mannich reaction product of
   a) a polyisobutene-substituted phenol wherein at least 70% of the terminal olefinic double bonds in the polyisobutene are of the vinylidene type;
   b) an aldehyde;
   c) ethylene diamine.

2. Compound according to claim 1 wherein the polyisobutene has a number average molecular weight of from 700 to 2300.

3. Compound according to claim 1 wherein the polyisobutene has a number average molecular weight of from 750 to 1500.

4. Compound according to claim 1 wherein the aldehyde is a ($C_1$–$C_6$) aldehyde.

5. Compound according to claim 1 wherein the aldehyde is formaldehyde.

6. Additive package comprising from 5 to 30% by weight of a compound according to claim 1, a carrier fluid and a solvent.

7. Additive package according to claim 6 wherein the carrier fluid is an alkoxylated alkyl phenol, and/or the solvent is an aromatic solvent.

8. Composition comprising a hydrocarbon fuel, and a compound or additive package according to claim 1, wherein the concentration of said compound in the fuel is from 10 to 1000 ppm by weight.

9. Process for producing a compound as defined in claim 1, comprising reacting together an polyisobutene phenol, an aldehyde, and ethylene diamine under conditions suitable for a Mannich condensation reaction.

10. A composition according to claim 8, wherein said hydrocarbon fuel is a gasoline or diesel fuel.

* * * * *